(12) United States Patent
Gutierrez

(10) Patent No.: US 9,325,381 B2
(45) Date of Patent: Apr. 26, 2016

(54) METHODS, APPARATUS AND ARTICLES OF MANUFACTURE TO MONITOR MOBILE DEVICES

(71) Applicant: THE NIELSEN COMPANY (US), LLC, New York, NY (US)

(72) Inventor: Alejandro Gutierrez, Dallas, TX (US)

(73) Assignee: The Nielsen Company (US), LLC, New York, NY (US)

( * ) Notice: Subject to any disclaimer, the term of this patent is extended or adjusted under 35 U.S.C. 154(b) by 13 days.

(21) Appl. No.: 13/833,677

(22) Filed: Mar. 15, 2013

(65) Prior Publication Data

US 2014/0273822 A1    Sep. 18, 2014

(51) Int. Cl.
  *H04B 5/00* (2006.01)
  *H04M 1/725* (2006.01)
(52) U.S. Cl.
  CPC ........... *H04B 5/0031* (2013.01); *H04M 1/7253* (2013.01); *H04M 1/72575* (2013.01); *H04M 2250/04* (2013.01)
(58) Field of Classification Search
  CPC combination set(s) only.
  See application file for complete search history.

(56) References Cited

U.S. PATENT DOCUMENTS

| | | | |
|---|---|---|---|
| 4,677,466 A | 6/1987 | Lert, Jr. et al. | |
| 5,436,653 A | 7/1995 | Ellis et al. | |
| 5,481,294 A | 1/1996 | Thomas et al. | |
| 5,526,427 A | 6/1996 | Thomas et al. | |
| 5,579,124 A | 11/1996 | Aijala et al. | |
| 5,675,510 A | 10/1997 | Coffey et al. | |
| 5,778,182 A | 7/1998 | Cathey et al. | |
| 5,796,952 A | 8/1998 | Davis et al. | |
| 5,872,588 A | 2/1999 | Aras et al. | |
| 5,963,909 A | 10/1999 | Warren et al. | |
| 6,097,441 A | 8/2000 | Allport | |
| 6,108,637 A | 8/2000 | Blumenau | |
| 6,115,680 A | 9/2000 | Coffee et al. | |
| 6,138,147 A | 10/2000 | Weaver et al. | |
| 6,286,104 B1 | 9/2001 | Buhle et al. | |
| 6,353,929 B1 | 3/2002 | Houston | |
| 6,466,765 B1 | 10/2002 | Tanaka et al. | |
| 6,467,089 B1 | 10/2002 | Aust et al. | |

(Continued)

FOREIGN PATENT DOCUMENTS

| AU | 2005251196 | 12/2005 |
|---|---|---|
| CN | 1557093 | 12/2004 |

(Continued)

OTHER PUBLICATIONS

The Manchester 300, "Out of the Lab and into the Field: A Report on the Extended Field Test of Arbitron's Portable People Meter in Manchester, England," Jan. 1, 2000, 23 pages, Report Arbitron.

(Continued)

*Primary Examiner* — Junpeng Chen
(74) *Attorney, Agent, or Firm* — Hanley, Flight & Zimmerman, LLC

(57) ABSTRACT

Methods, apparatus, systems and articles of manufacture to monitor mobile devices are disclosed. An example apparatus includes a shell having a form factor dimensioned to receive a mobile device; and a near-field interceptor coupled to the shell, the near-field interceptor to capture data communicated via a near-field energy field between a first near-field communication device of the mobile device and a second near field communication device external to the mobile device.

25 Claims, 9 Drawing Sheets

(56) References Cited

U.S. PATENT DOCUMENTS

| | | |
|---|---|---|
| 6,577,346 B1 | 6/2003 | Perlman |
| 6,675,383 B1 | 1/2004 | Wheeler et al. |
| 6,745,011 B1 | 6/2004 | Hendrickson et al. |
| 6,754,470 B2 | 6/2004 | Hendrickson et al. |
| 6,810,413 B1 | 10/2004 | Rajakarunanayake et al. |
| 6,834,308 B1 | 12/2004 | Ikezoye et al. |
| 6,934,508 B2 | 8/2005 | Ceresoli et al. |
| 7,222,071 B2 | 5/2007 | Neuhauser et al. |
| 7,289,643 B2 | 10/2007 | Brunk et al. |
| 7,340,677 B2 | 3/2008 | Cowperthwaite |
| 7,587,732 B2 | 9/2009 | Wright et al. |
| 8,112,066 B2 | 2/2012 | Ben Ayed |
| 8,225,342 B2 | 7/2012 | Mears et al. |
| 8,315,554 B2 | 11/2012 | Levy et al. |
| 8,914,819 B2 | 12/2014 | Mears et al. |
| 2002/0026635 A1 | 2/2002 | Wheeler et al. |
| 2002/0032904 A1 | 3/2002 | Lerner |
| 2002/0042730 A1 | 4/2002 | Homer |
| 2002/0056089 A1 | 5/2002 | Houston |
| 2002/0059577 A1 | 5/2002 | Lu et al. |
| 2002/0107701 A1 | 8/2002 | Batty et al. |
| 2002/0111912 A1 | 8/2002 | Hunter et al. |
| 2002/0112048 A1 | 8/2002 | Gruyer et al. |
| 2002/0178441 A1 | 11/2002 | Hashimoto |
| 2003/0053792 A1 | 3/2003 | Janevski |
| 2003/0073402 A1 | 4/2003 | Herring et al. |
| 2003/0131350 A1 | 7/2003 | Peiffer et al. |
| 2003/0170001 A1 | 9/2003 | Breen |
| 2004/0019463 A1 | 1/2004 | Kolessar et al. |
| 2004/0019675 A1 | 1/2004 | Hebeler, Jr. et al. |
| 2004/0051812 A1 | 3/2004 | Hayward |
| 2004/0064319 A1 | 4/2004 | Neuhauser et al. |
| 2004/0116067 A1 | 6/2004 | Karaoguz et al. |
| 2004/0117224 A1 | 6/2004 | Agarwal et al. |
| 2004/0122679 A1 | 6/2004 | Neuhauser et al. |
| 2004/0132407 A1 | 7/2004 | Hein-Magnussen et al. |
| 2004/0254887 A1 | 12/2004 | Jacoby |
| 2005/0086334 A1 | 4/2005 | Aaltonen et al. |
| 2005/0119967 A1 | 6/2005 | Ishiguro et al. |
| 2005/0144632 A1 | 6/2005 | Mears et al. |
| 2005/0204379 A1 | 9/2005 | Yamamori |
| 2005/0216509 A1 | 9/2005 | Kolessar et al. |
| 2005/0225665 A1 | 10/2005 | Chen |
| 2005/0228665 A1 | 10/2005 | Kobayashi et al. |
| 2005/0232411 A1 | 10/2005 | Srinivasan et al. |
| 2005/0267750 A1 | 12/2005 | Steuer et al. |
| 2006/0105702 A1 | 5/2006 | Muth et al. |
| 2006/0129496 A1 | 6/2006 | Chow et al. |
| 2006/0294225 A1 | 12/2006 | Grecco et al. |
| 2007/0006250 A1 | 1/2007 | Croy et al. |
| 2007/0006275 A1 | 1/2007 | Wright et al. |
| 2007/0011040 A1 | 1/2007 | Wright et al. |
| 2007/0038516 A1 | 2/2007 | Apple et al. |
| 2007/0050832 A1 | 3/2007 | Wright et al. |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0022294 A1 | 1/2008 | Perrin et al. |
| 2008/0081608 A1 | 4/2008 | Findikli et al. |
| 2008/0091489 A1 | 4/2008 | LaRock et al. |
| 2008/0263579 A1 | 10/2008 | Mears et al. |
| 2009/0077578 A1 | 3/2009 | Steuer et al. |
| 2009/0222848 A1 | 9/2009 | Ramaswamy |
| 2011/0280408 A1 | 11/2011 | Falcon |
| 2012/0238209 A1* | 9/2012 | Walker et al. ............. 455/41.2 |
| 2013/0207778 A1* | 8/2013 | Neafsey et al. ............. 340/5.61 |
| 2013/0309966 A1* | 11/2013 | Aldana et al. ............. 455/41.1 |
| 2014/0065948 A1* | 3/2014 | Huang ............................. 455/7 |
| 2014/0077669 A1* | 3/2014 | Choi et al. ............. 312/223.1 |
| 2015/0058299 A1 | 2/2015 | Fisch et al. |

FOREIGN PATENT DOCUMENTS

| | | |
|---|---|---|
| CN | 1663249 | 8/2005 |
| CN | 1685735 | 10/2005 |
| CN | 101371472 | 2/2009 |
| EP | 1213860 | 12/2002 |
| JP | 2000307530 | 11/2000 |
| JP | 2002344933 | 11/2002 |
| JP | 2004272810 | 9/2004 |
| WO | 9810539 | 3/1998 |
| WO | 0058962 | 10/2000 |
| WO | 0245273 | 6/2002 |
| WO | 2005038625 | 4/2005 |
| WO | 2005079457 | 9/2005 |
| WO | 2005079941 | 9/2005 |
| WO | 2005119651 | 12/2005 |
| WO | 2007048124 | 4/2007 |
| WO | 2007070789 | 6/2007 |

OTHER PUBLICATIONS

Steve Friess, "Nielsen, TiVo Try Ratings Game," (retrieved from the Internet: http://www.wired.com/print/entertainment/music/news/2002/09/55091 on Mar. 5, 2009), Sep. 13, 2002, 2 pages.

Think CP Technologies, "Think Headtrip," (retrieved from the Internet: http://www.thinkcp.com/products/thinkheadtrip.asp on Jan. 18, 2006), 2 pages.

Wireless Dynamics Inc., iCarte® 520NFC/RFID & Payment Adaptor for iPhone® 5, Product Data Sheet, received Mar. 1, 2013, 1 page.

United States Patent and Trademark Office, "Office Action," issued in connection with U.S. Appl. No. 12/106,040, Sep. 30, 2010, 11 pages.

United States Patent and Trademark Office, "Final Office Action," issued in connection with U.S. Appl. No. 12/106,040, May 17, 2011, 13 pages.

United States Patent and Trademark Office, "Office Action," issued in connection with U.S. Appl. No. 12/106,040, Apr. 5, 2012, 13 pages.

United States Patent and Trademark Office, "Final Office Action," issued in connection with U.S. Appl. No. 12/106,040, Oct. 29, 2012, 17 pages.

European Patent Office, "Supplementary Search Report," issued in connection with EP 06 82 7898, Mar. 17, 2009, 2 pages.

European Patent Office, "Search Report," issued in connection with related European application No. 06 827 898.5, Apr. 9, 2009 (8 pages).

European Patent Office, "Extended Search Report," issued in connection with European Patent Application No. 10008093.6, Nov. 5, 2010, 12 pages.

European Patent Office, "Examination Report," issued in connection with European Patent Application No. 10008093.6, Sep. 19, 2011, 4 pages.

European Patent Office, "Extended European Search Report," issued in connection with European Patent Application No. 11006764.2, Jan. 23, 2012, 10 pages.

International Searching Authority, "Search Report and Written Opinion," issued in connection with PCT/US06/60115, Feb. 28, 2008, 8 pages.

International Searching Authority, "Search Report and Written Opinion," issued in connection with PCT/US06/60118, Mar. 14, 2008, 8 pages.

IP Australia, "Examiner's First Report," issued in connection with Australian patent application No. 2006304933, Apr. 22, 2010, 2 pages.

IP Australia, "Examiner's Second Report," issued in connection with Australian patent application No. 2006304933, Jun. 2, 2011, 2 pages.

IP Australia, "Notice of Acceptance," issued in connection with Australian patent application No. 2006304933, Jul. 7, 2011, 3 pages.

Canadian Intellectual Property Office, "Office Action," issued in connection with application No. 2626798, Oct. 28, 2011, 3 pages.

Canadian Intellectual Property Office, "Office Action," issued in connection with application No. 2626798, Dec. 21, 2012, 3 pages.

The State Intellectual Property Office of China, "First Notification of Office Action," issued in connection with Chinese Patent Application No. 200680045794.7, Dec. 7, 2011, 16 pages.

(56) References Cited

OTHER PUBLICATIONS

The State Intellectual Property Office of China, "Notice of Completion of Formalities for Patent Registration," issued in connection with Chinese Patent Application No. 200680045794.7, Sep. 5, 2012, 5 pages.
The Korean Intellectual Property Office, "Notice of Preliminary Rejection," issued in connection with Korean Patent Application No. 10-2008-7012179, Sep. 27, 2012, 5 pages.
Mexican Institute of Industrial Property, "Official Action," issued in connection with Mexican Patent Application No. Mx/a/2008/005249, Aug. 5, 2011, 2 pages.
United States Patent and Trademark Office, "Office Action," issued in connection with U.S. Appl. No. 12/106,040, Jun. 24, 2013, 15 pages.
Mexican Institute of Industrial Property, "Official Action," issued in connection with Mexican Patent Application No. Mx/a/2011/013715, Jul. 19, 2013, 5 pages.
European Patent Office, "Examiner's Report," in connection with European Application No. 11 006764.2-191 0, May 27, 2013, 3 pages.
European Patent Office, "Intention to Grant," issued in connection with European Patent Application No. 11 006 764.2, on Dec. 17, 2012, 8 pages.
"Korean Patent Office ""Notice of Preliminary Rejection,"" issued in connection with Korean Patent Application No. 10-2008-7012179, on Apr. 29, 2013, 9 pages".
United States Patent and Trademark Office, "Notice of Allowance," issued in connection with U.S. Appl. No. 12/106,040, Jul. 18, 2014, 17 pages.
IP Australia, "Patent Examination Report No. 1," issued in connection with Application No. 2011239270, Feb. 5, 2014, 5 pages.
IP Australia, "Patent Examination Report No. 1," issued in connection with Application No. 2013203923, Feb. 5, 2014, 4 pages.
European Patent Office, "Intent to Grant," issued in connection with European Patent Application No. 11006764.2, on Feb. 2, 2014 (8 pages).
European Patent Office, "Intent to Grant," issued in connection with European Patent Application No. 11006764.2, on Jul. 9, 2014 (8 pages).
European Patent Office, "Decision to Grant," issued in connection with European Patent Application No. 11006764.2, on Nov. 20, 2014 (4 pages).
IP Australia, "Notice of Acceptance," issued in connection with Australian Patent Application No. 2013203923, on Jan. 15, 2015 (2 pages).
State Intellectual Property Office of China, "First Office Action," issued in connection with Chinese Patent Application No. 201210472409.4, on Nov. 24, 2014 (14 pages).
Mexican Institute ofIndustrial Property, "Office Action," issued in connection with Mexican Patent Application No. Mx/a/2014/004336, on Dec. 11, 2014 (2 pages).
Patent Cooperation Treaty, "International Preliminary Report on Patentability," issued in connection with International Patent Application No. PCT/US06/60 118, on Apr. 29, 2008 (7 pages).
IP Australia, "Patent Examination Report No. 2," issued in connection with Application No. 2011239270, Mar. 24, 2015, 3 pages.
State Intellectual Property Office of China, "Second Office Action," issued in connection with Chinese Patent Application No. 201210472409.4, Aug. 7, 2015 (15 pages).
United States Patent and Trademark Office, "Non-Final Office Action," issued in connection with U.S. Appl. No. 14/529,922, Jul. 31, 2015, 21 pages.
IP Australia, "Notice of Grant," issued in connection with Application No. 2013203923, May 14, 2015, 2 pages.
State Intellectual Property Office of China, "First Office Action," issued in connection with Chinese Patent Application No. 201210472240.2, Jan. 6, 2015 (16 pages).
Patent Cooperation Treaty, "International Search Report," issued in connection with International Patent Application No. PCT/US06/60118, on Mar. 14, 2008, 2 pages.
Patent Cooperation Treaty, "Written Opinion," issued in connection with International Patent Application No. PCT/US06/60118, on Mar. 14, 2008, 8 pages.
The State Intellectual Property Office of China, "Second Office Action," issued in connection with Application No. 201210472240.2, Sep. 21, 2015, 6 pages.
European Patent Office, "Communication pursuant to Article 94(3) EPC," issued in connection with Application No. 06827898.5, Aug. 10, 2009, 6 pages.
Mexican Institute of Industrial Property. "Notice of Allowance," issued in connection with Mexican Patent Application No. Mx/a/2008/005249, Feb. 7, 2012, 1 page.
European Patent Office, "Decision to Grant," issued in connection with Application No. 06827898.5, Jul. 22, 2010, 1 page.
United States Patent and Trademark Office, "Final Office Action," issued in connection with U.S. Appl. No. 12/106,040, Feb. 14, 2014, 28 pages.
European Patent Office, "Communication pursuant to Article 94(3) EPC," issued in connection with Application No. 10008093.6, Dec. 21, 2015, 7 pages.
Spill et al., "BlueSniff: Eve meets Alice and Bluetooth," Jan. 1, 2007, retrieved from: http://static.usenix.org/event/woot07/tech/fullpapers/spill/spill.pdf, 10 pages.
"FTS4BT_Packet Sniffers, Network Sniffing Tools, and Protocol Analyzers for . . . Bluetooth . . . ," Aug. 16, 2005, retrieved from http://web.archive.org/web/20050816121208/http://www.fte.com/, 1 page.
United States Patent and Trademark Office, "Final Office Action," issued in connection with U.S. Appl. No. 14/529,922, Feb. 18, 2016, 6 pages.

* cited by examiner

METHODS, APPARATUS AND ARTICLES OF MANUFACTURE TO MONITOR MOBILE DEVICES

FIELD OF THE DISCLOSURE

This disclosure relates generally to media measurement and, more particularly, to methods, apparatus and articles of manufacture to monitor mobile devices.

BACKGROUND

Audience measurement of media (e.g., broadcast television and/or radio, stored audio and/or video played back from a memory such as a digital video recorder or a digital video disc, a webpage, audio and/or video media presented (e.g., streamed) via the Internet, a video game, etc.) often involves collection of media identifying data (e.g., signature(s), fingerprint(s), code(s), tuned channel identification information, time of exposure information, etc.) and people data (e.g., user identifiers, demographic data associated with audience members, etc.). The media identifying data and the people data can be combined to generate, for example, media exposure data indicative of amount(s) and/or type(s) of people that were exposed to specific piece(s) of media.

Measurement of consumer activity and/or purchasing habits involves collecting information related to financial transactions between consumers and providers of goods and/or services.

Figure 1:
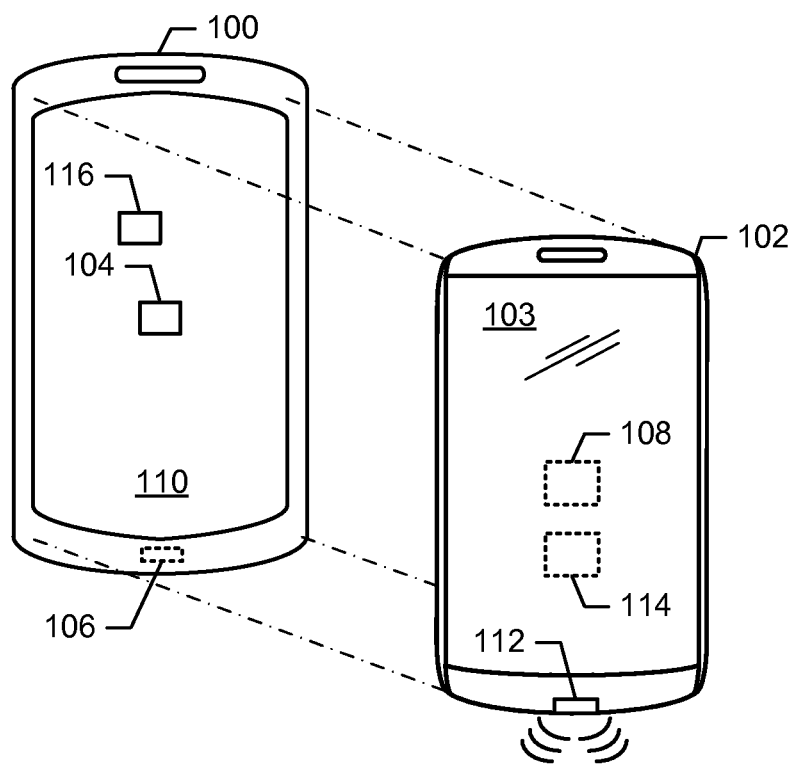
FIG. 1 is a plan view of a first example mobile device case constructed in accordance with teachings of this disclosure.

The figures are not to scale. Wherever possible, the same reference numbers will be used throughout the drawing(s) and accompanying written description to refer to the same or like parts. As used in this patent, stating that any part (e.g., any structure, layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Some audience measurement systems include metering equipment installed in a media exposure environment, such as a living room of a household. For example, a meter configured to collect audio data and/or image data from the media exposure environment can be installed in the media exposure environment in connection with one more media presentation devices. Such metering equipment monitors stationary media devices such as televisions, radios, DVD players, desktop computers, etc. For example, when media is presented in the media exposure environment, the metering equipment collects media identifying information associated with the presented media. The media identifying information can be correlated with audience composition information associated with the environment to generate media measurement data (e.g., ratings) for the detected media.

Technological developments in the area of mobile device computing have led to an increasingly diverse range of uses for mobile devices. Some mobile devices, such as a smart phone (e.g., iPhone®), a tablet (e.g., iPad®), a portable media player (e.g., MP3 player, AAC player, such as an iPod®), etc., provide a plurality of different functions. A single mobile device may serve not only as a cellular telephone, but as a media presentation device as well. For example, mobile devices are used as Internet access devices, electronic mail clients, cameras, music players, video players, and/or for other purposes depending on capabilities (e.g., hardware and/or software) of the particular mobile device. Thus, different types of media (e.g., audiovisual data streams, websites, advertisements, music streams, Internet television programming, media stored locally on the mobile device, etc.) may be accessed via a single mobile device.

Moreover, a mobile device having near-field communication capability may additionally or alternatively be used to communicate data over an energy field to and/or from another device having near-field communication capability. An example set of standards for near-field communication is referred to as Near Field Communication (NFC). While near-field communication is described herein in connection with NFC-capable devices, examples disclosed herein may be utilized in connection with any suitable past, present and/or future near-field communication standard and/or technology. When an NFC-capable mobile device is placed in proximity or contact with another NFC-capable device (e.g., a point-of-sale (POS) register including an NFC transceiver or a different NFC-capable mobile device), a link is established between NFC components of the respective devices via an energy field (e.g., an NFC field). In particular, one of the NFC-capable devices acts as an initiator by generating the NFC field (e.g., a radio frequency field). Any other NFC-capable device(s) located within the NFC field are referred to as targets, which can be active or passive NFC-capable devices. An active NFC-capable target is capable of responding to the initiator and/or querying the initiator. That is, an active NFC-capable target can exchange data with the initiator and/or act as an initiator. A passive NFC-capable target receives and/or stores data transmitted by the initiator and is typically powered by the energy field generated by the initiator.

While the NFC field can be used to exchange any suitable type of data, NFC capabilities are increasingly being used in financial transactions at retail locations, such as for purchases of goods and/or services. For example, when a purchaser approaches a point-of-sale register with a product to purchase, an NFC-capable register component is activated (e.g., generates an NFC field) and the purchaser is asked to place his or her NFC-capable mobile device in proximity or contact with the NFC-capable register component. If the NFC-capable mobile device is properly placed in the corresponding NFC field, a communication session between the NFC-capable register component and the NFC-capable mobile device is established. The communication session includes an exchange of, for example, payment information (e.g., credit card data and/or account information), purchase information (e.g., product identifier(s), sale and/or discount information), personal information associated with the purchaser (e.g., name, address, demographic information), mobile device information (e.g., make, model, manufacturer, version, etc.), store information (e.g., name and/or location), and/or any other applicable data.

Thus, among other functions, some mobile devices are used to access media, present media, transmit data via near-field communications, and/or receive data via near-field communications. Monitoring media presented on mobile devices presents challenges. For example, operating systems of some mobile devices prohibit those having user-level privileges from capturing media identifying data via a software solution. Such operating systems prevent one application from "listening in" on a second application. In such "sandboxing" instances, a monitoring application downloaded onto the mobile device would not have access to data generated by a media application of the mobile device such as, for example, a data stream presenter (e.g., Pandora®) or a local media player (e.g., a music application). Accordingly, software-based media monitors are often not viable options for monitoring mobile devices.

Capturing data communicated via near-field communications by mobile devices also presents challenges. Due in part to the common use of near-field communication technology (e.g., NFC standards) for financial transactions and the sensitive data involved in such transactions, near-field communications are highly protected. For example, the NFC standard includes safety features such as data encryption and device authentication. Further, NFC-capable devices include operating system level protections for data transmitted via the NFC communication components. For these and/or other reasons, software solutions for monitoring near-field communications of mobile devices are not feasible without cooperation from mobile payment providers that manage the corresponding applications. For example, without the mobile payment provider granting access to the protected environment in which the corresponding application is executed, foreign software could not access the NFC transactions of a mobile device.

Moreover, monitoring entities are hard pressed to place metering equipment or hardware capable of capturing data within the energy field used in near-field communications. For one, due to the mobility of NFC-capable mobile devices, the location of the energy field is unpredictable. Further, the energy field is quite small. In some instances, the NFC-capable devices are required to be within inches of each other or in physical contact with each to properly exchange data.

Examples disclosed herein provide method and apparatus to monitor mobile devices that overcome these and other difficulties. In particular, examples disclosed herein include mobile device peripherals and/or accessories that include metering equipment to monitor media presented via mobile devices and/or to monitor near-field communications of mobile devices. For monitoring media accessed on mobile devices, examples disclosed herein recognize that an internal software solution such as a downloaded on device meter (ODM) is often an unfeasible option due to, for example, operating system constraints. Accordingly, examples disclosed herein integrate a media meter into, for example, a case designed for a mobile device and/or other type of peripheral. As described in detail below, one or more types of sensors are deployed in example cases(s) and/or other peripherals disclosed herein to collect, for example, audio data associated with a media presentation generated by corresponding mobile devices carried by and/or coupled to example cases(s) and/or other peripherals disclosed herein. In some examples disclosed herein, the one or more sensors include a wireless interface paired with the mobile device. In such examples, the wireless interface is capable of collecting (e.g., intercepting) wireless data output by the mobile device. Additionally or alternatively, the one or more sensors of the disclosed examples include a microphone to collect an audio signal generated by the mobile device. By providing a mobile device peripheral (e.g., a case) including the one or more sensors, examples disclosed herein enable metering of media accessed on the mobile devices without having to install a software meter within the mobile devices. In doing so, examples disclosed herein provide a reliable solution to metering mobile devices. Further, by providing a mobile device case or other peripheral capable of monitoring media presentations, examples disclosed provide media meters that can be deployed in connection with any type of mobile device running any type of operating system. Further, by providing a mobile device case or other peripheral, examples disclosed herein position a media meter in continuous proximity with the corresponding mobile device and/or an output device thereof (e.g., a speaker) irrespective of the travels of the panelist carrying the device.

Examples disclosed herein provide metering entities with a presence in and/or in proximity to energy fields of near-field communications by deploying a near-field receiver in a mobile device peripheral, such as a case designed to house the mobile device. In particular, examples disclosed herein position an NFC antenna in a mobile device case or other peripheral such that the NFC antenna is located in an NFC field generated by an NFC component of the corresponding mobile device and/or an NFC field generated by a different device (e.g., an NFC-capable point-of-sale register) into which the mobile device is placed by a user. In doing so, examples disclosed herein place a data collection device in the otherwise access-prohibitive (e.g., small and unpredictably located) NFC energy field. Data collected by the NFC antenna of example mobile device cases and/or other peripherals disclosed herein can be analyzed to provide, for example, consumer activity information associated with purchases made via NFC-capable mobile devices.

In some examples, example mobile device cases and/or other peripherals disclosed herein are provided to mobile device users as an incentive to become a member of a media measurement panel. For example, a metering entity (e.g., the Nielsen Company (US), LLC) may provide example mobile device cases and/or other peripherals disclosed herein in exchange for becoming a panelist. Additionally or alternatively, the metering entity may provide example mobile device cases and/or other peripherals disclosed herein as a reward for continued membership in the panel. Additionally or alternatively, the metering entity may agree to pay for one or more usage fees for the mobile device in exchange for becoming a panelist and/or for placing the mobile device in example mobile device cases and/or other peripherals disclosed herein.

FIG. 1 illustrates a first example mobile device peripheral 100 constructed in accordance with teachings of this disclosure. While the first example mobile device peripheral 100 of FIG. 1 is a smart phone case, examples disclosed herein can be implemented in additional or alternative peripheral(s) such as, for example, a key fob attachable to a key chain. The first example mobile device peripheral 100 of FIG. 1 is a smart phone case having a form factor corresponding to a particular smart phone 102 (e.g., an iPhone®). The example smart phone case 100 of FIG. 1 is designed to wrap around a back and side edges of the smart phone 102 such that a touch screen 103 of the smart phone 102 is exposed (e.g., not covered by the case 100) when the smart phone 102 is carried by the example smart phone case 100 of FIG. 1. The example smart phone case 100 of FIG. 1 is dimensioned such that the smart phone 102 securely fits within the example smart phone case 100. The example smart phone case 100 of FIG. 1 includes an NFC interceptor 104 and a meter 106. In the illustrated example the NFC interceptor 104 is integrated with and/or carried by the smart phone case 100. The example NFC interceptor 104 of FIG. 1 is a passive NFC tag that is powered by an NFC field generated by another NFC-capable device. For example, the example smart phone 102 includes an active NFC component 108 capable of generated an NFC field (e.g., when acting as an NFC initiator for a communication over the NFC field with another NFC-capable device). In the illustrated example, the NFC component 108 of the smart phone 102 is located in a rear portion (e.g., a battery cover) of the smart phone 102. In such instances, the example NFC interceptor 104 of FIG. 1 is located on a back 110 of the example smart phone case 100 of FIG. 1 such that the NFC interceptor 104 is adjacent to the NFC component 108 of the smart phone 102. Accordingly, the example NFC interceptor 104 of FIG. 1 is positioned in the same NFC field as the NFC component 108 of the smart phone 102 when the smart phone 102 is communicating via the NFC component 108. In other words, the location of the example NFC interceptor 104 of FIG. 1 in the smart phone case 100 is selected to coincide with the location of the NFC component 108 of the particular smart phone 102. This location may differ from one smart phone to another. Thus, the example case 100 disclosed herein may be specifically designed for use with specific models and/or brands of devices (e.g., phone, tablet, etc.). In some examples, the NFC interceptor 104 is located at an alternative location in the smart phone case 100 farther away from the NFC component 108 location but still within range of NFC fields used by the example NFC component 108. That is, the example NFC interceptor 104 is located within range of the of the example NFC component 108 when the smart phone 102 is carried by the example smart phone case 100 of FIG. 1.

Figure 2:
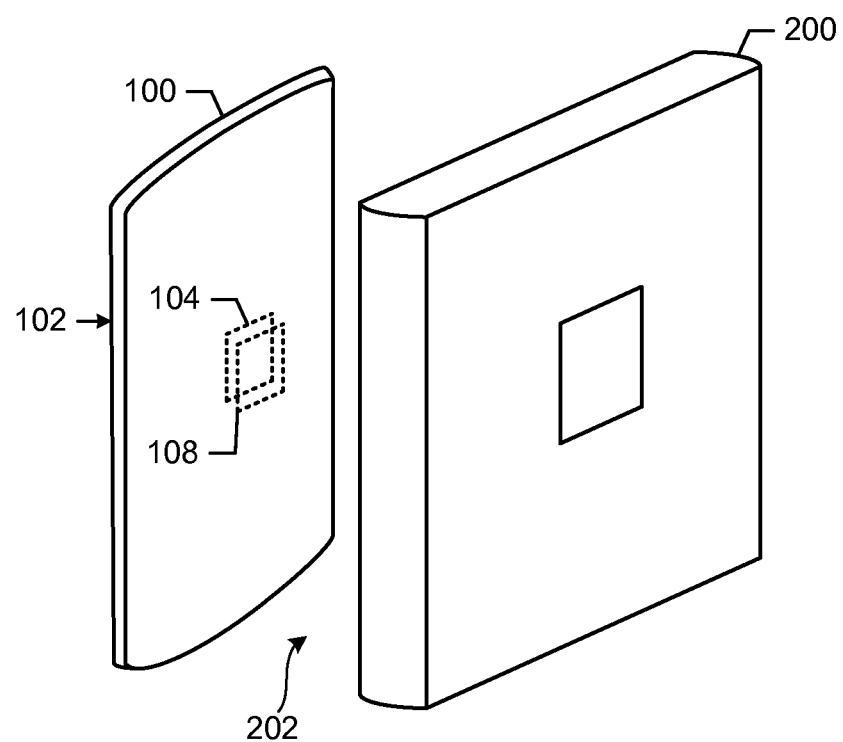
FIG. 2 is a plan view of a second example mobile device case constructed in accordance with teachings of this disclosure.

When the example NFC interceptor 104 of the example smart phone case 100 of the illustrated example is placed in an NFC field, the example NFC interceptor 104 of FIG. 1 is activated (e.g., powered by the NFC field) and captures data transmitted via the NFC field between the NFC component 108 of the smart phone 102 and another NFC-capable device. Alternatively, the example NFC interceptor 104 can be an active device powered by, for example, a power source (e.g., battery) of the example smart phone case 100. FIG. 2 illustrates the example smart phone 102 of FIG. 1 carried by the example smart phone case 100 of FIG. 1 and placed in proximity with a point-of-sale NFC device 200. While the example of FIG. 2 includes a point-of-sale device, the example smart phone 102 can communicate via the NFC component 108 with any other type of NFC-capable device, such as another NFC-capable mobile device. The example point-of-sale NFC device 200 of FIG. 2 is in communication with, for example, a register and/or any other suitable type of financial transaction equipment capable of completing a financial transaction with the smart phone 102. The example smart phone 102 includes one or more applications for executing financial transactions with, for example, the point-of-sale NFC device 200 of FIG. 2. When prompted, a user of the smart phone 102 places the smart phone 102 (being carried by the example smart phone case 100) in proximity to (e.g., in physical contact with) the point-of-sale NFC device 200. In the illustrated example, the back 110 of the smart phone case 100 faces the point-of-sale NFC device 200 such that the NFC component 108 of the smart phone 102 can communicate with the point-of-sale NFC device 200 via an NFC field 202. In some examples, the point-of-sale NFC device 200 acts as the initiator of the NFC field 202 and the example NFC component 108 of the smart phone 102 acts as a target. Alternatively, the example NFC component 108 of the smart phone 102 may act as the initiator and the point-of-sale NFC device 200 may act as a target. However, the example NFC interceptor 104 of the illustrated example is neither the initiator nor the target for the communication between the point-of-sale NFC device 200 and the NFC component 108 of the smart phone 102.

As shown in the example of FIG. 2, the example smart phone case 100 positions the example NFC interceptor 104 in the NFC field 202 and, thus, enables capture of data communicated between the smart phone 102 and the point-of-sale NFC device 200. When powered (e.g., by the example NFC field 202 of FIG. 2 and/or a power source of the smart phone case 100), the example NFC interceptor 108 collects (e.g., generates a log of) data present in the NFC field 202. For example, the NFC interceptor 104 of the illustrated example collects data representative of a product purchased at the point-of-sale NFC device 200, a purchase price, an entity associated with the point-of-sale NFC device 200, sale and/or discount information, identifying information associated with the user of the smart phone 102, and/or any other suitable information. In some examples, the example smart phone case 100 includes a memory (e.g., flash memory) in communication with the example NFC interceptor 104 to store data captured via the NFC field 202. As described in greater detail below in connection with FIG. 5, the data captured by the example NFC interceptor 104 is communicated to, for example, the memory of the smart phone 102 for subsequent transmission to a data collection facility (e.g., a server of a consumer activity measurement entity and/or an audience measurement entity), a household meter associated with the user of the smart phone 102, a dock in wireless communication with the example smart phone case 100 of FIG. 1 capable of obtaining the data captured via the NFC inceptor 104 from the smart phone case 100, and/or any other suitable manner.

The example smart phone case 100 of FIG. 1 utilizes the meter 106 to collect data associated with media accessed via the smart phone 102. As described in greater detail below in connection with FIG. 5, the example meter 106 includes one or more types of sensors to collect audio of the accessed media. In some examples, the meter 106 includes an audio sensor (e.g., a microphone) to collect ambient audio data for an environment including the smart phone 102. In such instances, the meter 106 utilizes the audio sensor to collect audio data output by an audio output device (e.g., a speaker) 112 of the smart phone 102. In such instances, the example meter 106 and/or the audio sensor of the meter 106 is positioned in the example smart phone case 100 in a location adjacent the audio output device 112 of the smart phone 102 when the smart phone 102 is carried by the smart phone case 100 to thereby reduce negative effects of detecting audio signals not generated by the audio output device 112 and/or to reduce interference with the audio signals for the audio output device 112.

In some examples, the meter 106 includes and/or utilizes a wireless interface to collect wireless raw media data (e.g., audio data) transmitted by a wireless transceiver 114 of the smart phone 102 via any suitable wireless protocol or standard (e.g., Bluetooth®). In such instances, the example meter 106 captures the media data from the wireless stream of data generated by the smart phone 102 at the wireless interface. For example, the meter 106 pairs with the wireless transceiver 114 of the smart phone 102 such that the media data (e.g., Bluetooth® code corresponding to audio data) accessed on the smart phone 102 is communicated to the meter 106. Thus, in addition to, or in lieu of, listening to an ambient environment via a microphone for an audio signal output by the speaker 112, the example meter 106 of FIG. 1 can capture data corresponding to the media being sent to the speaker 112 via wireless communication with the wireless transceiver 114 of the smart phone 102. As described in detail below in connection with FIG. 5, example meter 106 of FIG. 1 includes a wireless interface (e.g., a Bluetooth® device) to pair with the wireless transceiver 114 of the smart phone 102. In some examples, the smart phone case 100 includes a second wireless interface (e.g., a second Bluetooth® device in addition to the Bluetooth® device of the meter 106) that communicates with the meter 106. In such instances, the second wireless interface also communicates with external device(s), such as speakers external to the smart phone case 100 and the smart phone 102. That is, the wireless interface of the meter 106 is paired with the wireless transceiver 114 of the smart phone and routes data received from the smart phone 102 to the second wireless interface of the smart phone case 100, which transmits the data to, for example, external speakers. Thus, as described in detail below in connection with FIG. 5, the example meter 106 can capture monitoring information via a pairing with the smart phone 102 and route received data to an external device via the second wireless interface described above.

Additionally or alternatively, the example smart phone case 100 of FIG. 1 implements a communication module 116 such as, for example, a WiMax transceiver, a 3G transceiver, a WiFi transceiver, etc. capable of communicating information via any suitable protocol to, for example, a data collection facility. In some examples, data collected via the NFC interceptor 104 and/or the meter 106 is communicated from the smart phone case 100 via the communication module 116. For example, when the smart phone case 100 is within range of a WiFi router, the example smart phone case 100 of FIG. 1 utilizes the communication module 116 to communicate collected data to the WiFi router which forwards the data to an intended destination (e.g., a server of a data collection facility associated with a monitoring entity). In some examples, the smart phone 102 is a mobile device having limited communication capabilities (e.g., the smart phone 102 is not actively supported by an Internet service provider). In such instances, the example smart phone case 100 may provide communication capabilities to the smart phone 102 via the communication module 116 (e.g., in addition to and/or in lieu of providing communication capabilities for the NFC interceptor 104 and/or the meter 106). In other words, in some examples, the example smart phone 102 of FIG. 1 utilizes the communication module 116 of the smart phone case 100 (e.g., via a wireless pairing) for one or more communication tasks of the smart phone 102.

While the example smart phone case 100 of FIG. 1 includes the example NFC interceptor 104 and the example meter 106, the example smart phone case 100 can be implemented with one of the NFC interceptor 104 or the example meter 106. In some examples, the NFC interceptor 104 is in communication with the example meter 106 and utilizes memory of the example meter 106 to store data collected via, for example, the NFC field 202 of FIG. 2.

Figure 3:
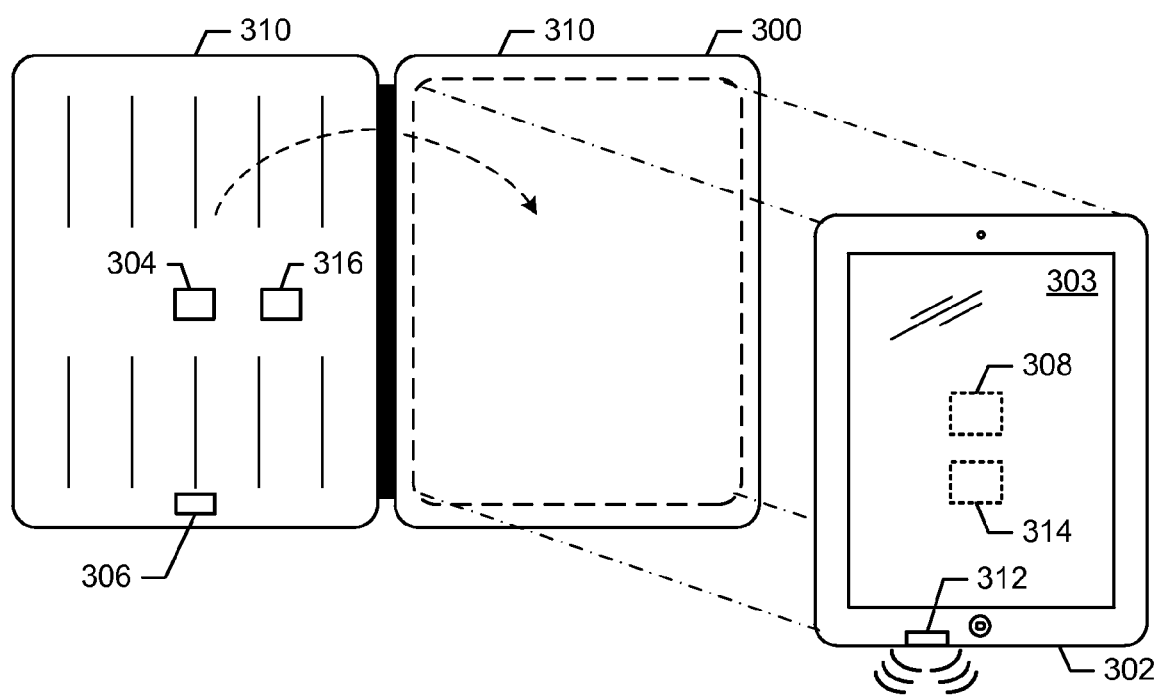
FIG. 3 is a plan view of a third example mobile device case constructed in accordance with teachings of this disclosure.

FIG. 3 illustrates a second example mobile device peripheral 300 constructed in accordance with teachings of this disclosure. The second example mobile device peripheral 300 of FIG. 3 is a tablet case (e.g., a case for an iPad®) having a form factor corresponding to a particular tablet 302 (e.g., an iPad® or an iPad Mini®). The example tablet case 300 of FIG. 3 includes an NFC interceptor 304 and a meter 306. The example NFC interceptor 304 of FIG. 3 is functionally similar to the example NFC interceptor 104 of FIG. 1 in that the example NFC interceptor 304 of FIG. 3 is capable of capturing data communicated between the example tablet 302 of FIG. 3 and another NFC-capable device, such as the point-of-sale NFC device 200 of FIG. 2. In particular, the example NFC interceptor 304 of FIG. 3 captures data from an NFC field in which an NFC component 308 of the example tablet 302 is placed during an NFC communication session.

In the illustrated example of FIG. 3, the NFC component 308 of the tablet 302 is located in a rear portion (e.g., a battery cover) of the tablet 302. In the illustrated example of FIG. 3, the example NFC interceptor 304 is located on (e.g., integrated with) a hinged cover portion 310 of the example tablet case 300 of FIG. 3 such that the NFC interceptor 304 is adjacent to the NFC component 308 of the tablet 302 when the cover portion 310 is flipped in front of or behind a receptacle portion 311 of the example tablet case 300. The receptacle portion 311 of the example tablet case 300 of FIG. 3 is designed to wrap around a back and side edges of the tablet 302 such that a touch screen 303 of the tablet 302 is exposed when the tablet 302 is carried by the receptacle portion 311 and the cover portion 310 is not flipped in front of the receptacle portion 311. The example receptacle portion 311 of the example tablet case 300 of FIG. 3 is dimensioned such that the tablet 302 securely fits within the example tablet case 300. Accordingly, the example NFC interceptor 304 of FIG. 3 is positioned in the same NFC field as the NFC component 308 of the tablet 302 when the tablet 302 is communicating via the NFC component 308. In other words, the location of the example NFC interceptor 304 of FIG. 3 in the tablet case 300 is selected to correspond to the expected or known location of the NFC component 308 of the particular tablet 302 with which the tablet case 300 is to be employed. This location is different from one tablet to another different tablet. In some examples, the NFC interceptor 304 is located at an alternative location in the tablet case 300. For example, the NFC inceptor 304 of FIG. 3 may be located on the receptacle portion 311 of the tablet case 300 in a position associated with the NFC component 308 of the tablet 302.

The example tablet case 300 of FIG. 3 utilizes the meter 306, which is functionally similar to the example meter 106 of FIG. 1, to collect data associated with media accessed via the tablet 302. In particular, the example meter 306 of FIG. 3 collects an audio signal generated by an audio output device (e.g., a speaker) 312 and/or intercepts wireless data communicated by a wireless transceiver 314 of the tablet 302 via any suitable wireless past, present and/or future protocol or standard (e.g., Bluetooth®). In the illustrated example of FIG. 3, the meter 306 is located on the cover portion 310 of the tablet case 300. Additionally or alternatively, the example meter 306 of FIG. 3 and/or one or more sensors associated with the example meter 306 can be differently located (e.g., on the receptacle portion 311 of the tablet case 300). In some examples, the NFC interceptor 306 and/or the meter 306 utilizes a communication module 316, which is functionally similar to the example communication module 116 of FIG. 1, to communicate data to, for example, a data collection facility. As described above, the example communication module 316 of FIG. 3 may additionally or alternatively be utilized by the tablet 302 for one or more communications. An example implementation of the example meter 306 of FIG. 3 is described in greater detail below in connection with FIG. 5.

Figure 4:
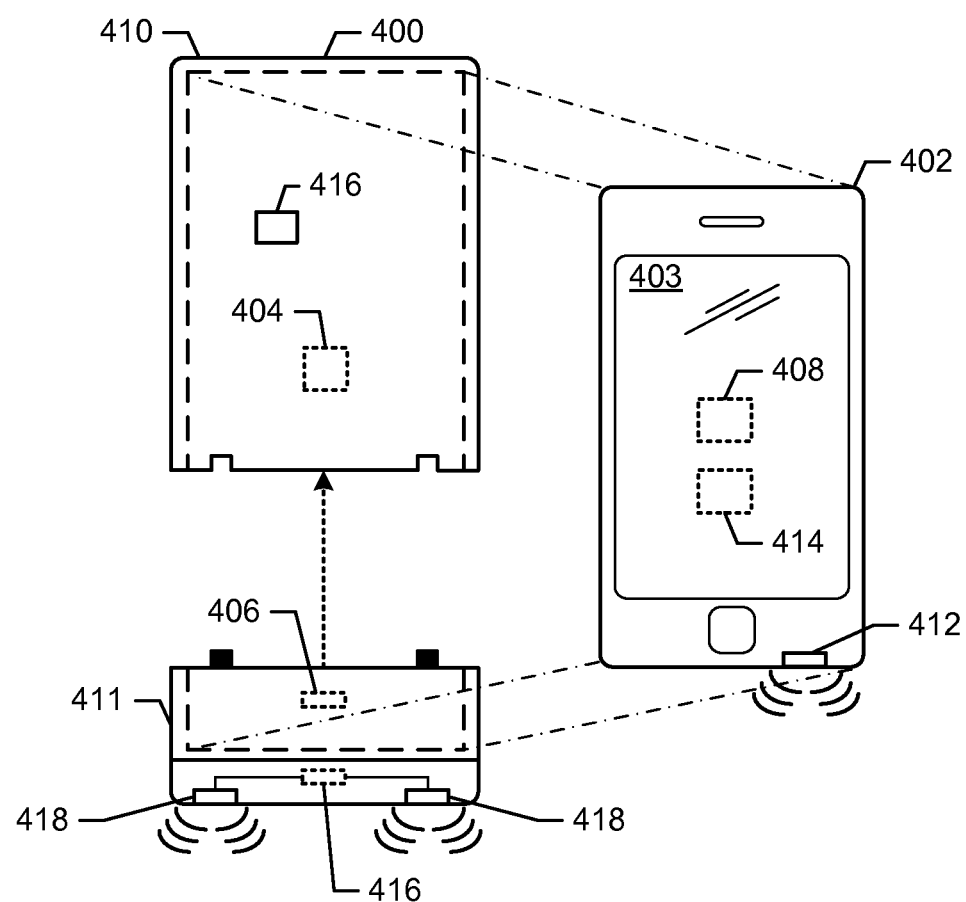
FIG. 4 is a diagram of the first example mobile device case proximate to a Near Field Communication (NFC) enabled device.

FIG. 4 illustrates a third example mobile device peripheral 400 constructed in accordance with teachings of this disclosure. The third example mobile device peripheral 400 of FIG. 4 is a media player case having a form factor corresponding to a particular media player 402 (e.g., an iTouch®). The example media player case 400 of FIG. 4 includes an NFC interceptor 404 and a meter 406. The example NFC interceptor 404 of FIG. 4 is functionally similar to the example NFC interceptors 104, 304 of FIGS. 1 and 3 in that the example NFC interceptor 404 of FIG. 4 is capable of capturing data communicated between the example media player 402 of FIG. 4 and another NFC-capable device, such as the point-of-sale NFC device 200 of FIG. 2. In particular, the example NFC interceptor 404 of FIG. 4 captures data from an NFC field in which an NFC component 408 of the example media player 402 is placed during an NFC communication session.

In the illustrated example of FIG. 4, the NFC component 408 of the media player 402 is located in a rear portion (e.g., a battery cover) of the media player 402. In the illustrated example of FIG. 4, the example NFC interceptor 404 is located on (e.g., integrated with) a first interlocking portion 410 of the example media player case 400 of FIG. 4 such that the NFC interceptor 404 is positioned adjacent to the NFC component 408 of the media player 402 when the media player 402 is carried by a combination of the first interlocking portion 410 and a second interlocking portion 411 of the media player case 400. The first and second interlocking portions 410, 411 of FIG. 4 are designed to engage each other with the media player 402 positioned in the media player case 400. Accordingly, when assembled, the example media player case 400 of FIG. 4 wraps around a back and side edges of the media player 402 such that a touch screen 403 of the media player 402 is exposed when the media player 402 is carried by the example media player case 402. The example media player case 400 of FIG. 4 is dimensioned such that the media player 402 securely fits within the example media player case 400 when the example media player case 400 is assembled. Accordingly, the example NFC interceptor 404 of FIG. 4 is positioned in the same NFC field as the NFC component 408 of the media player 402 when the media player 402 is communicating via the NFC component 08. In other words, the location of the example NFC interceptor 404 of FIG. 4 in the media player case 400 is selected to correspond to the location of the NFC component 408 of the particular media player 402 with which the media player case 402 is to be employed. This location is different from one media player to another different media player. In some examples, the NFC interceptor 404 is located at an alternative location in the media player case 400.

The example media player case 400 of FIG. 4 utilizes the meter 406, which is functionally similar to the example meters 106, 306 of FIGS. 1 and 3, to collect data associated with media accessed via the media player 402. In particular, the example meter 406 of FIG. 4 collects an audio signal generated by an audio output device (e.g., a speaker) 412 of the media player 412 and/or wireless (e.g., raw) data communicated by a wireless transceiver 414 of the media player 402 via any suitable wireless protocol or standard (e.g., Bluetooth®). However, while the example meters 104, 304 of FIGS. 1 and 3 are described above as being paired with the respective wireless transceivers 114, 314 of the mobile devices 102, 302, the example meter 404 of FIG. 4 utilizes a wireless transceiver 416 of the example media player case 400 of FIG. 4 to gather audio information. In particular, the example media player 400 of FIG. 4 includes a peripheral audio system 418 in communication with the wireless transceiver 416 of the case 400 to act as a peripheral audio system for the example media player 402. For example, the audio output component 412 of the example media player 402 may have limited capabilities. In such instances, the example peripheral audio system 418 of FIG. 4, which has greater capabilities than the example audio output component 412 of FIG. 4 can substitute for the audio output component 412 of the media player 402. In the illustrated example of FIG. 4, the wireless transceiver 414 of the media player 402 is paired with and communicates with the wireless transceiver 416 of the media player case 400 to deliver audio data to the peripheral audio system 418. In such instances, the example meter 406 includes an interface capable of capturing the audio data from the wireless transceiver 416. That is, when the media player 402 transmits the audio data to the example wireless transceiver 416 of the media player case 400, the example meter 406 captures the audio data in its raw form via a communication link (e.g., wired or wireless) with the wireless transceiver 416 of the media player case 400.

In the illustrated example of FIG. 4, the meter 406 is located on the second interlocking portion 411 of the media player case 400. Additionally or alternatively, the example meter 406 of FIG. 4 and/or one or more sensors associated with the example meter 406 can be differently located (e.g., on the first interlocking portion 410 of the media player case 400).

In some examples, the NFC interceptor 406 and/or the meter 406 utilizes a communication module 416, which is functionally similar to the example communication module 116 of FIG. 1, to communicate data to, for example, a data collection facility. As described above, the example communication module 416 of FIG. 4 may additionally or alternatively be utilized by the media player 402 for one or more communications. An example implementation of the example meter 406 of FIG. 4 is described in greater detail below in connection with FIG. 5.

As described above, the example mobile device peripherals 100, 300, 400 of FIGS. 1, 3 and 4 are cases designed to receive or carry the corresponding mobile devices 102, 302, 402. Each of the example mobile devices 102, 302, 402 of FIGS. 1, 3 and 4 includes a housing or case to carry components of the respective mobile device 102, 302, 402 such as, for example, a processor, memory, a cellular communication module, etc. In the examples disclosed herein, the cases 100, 300, 400 (e.g., peripherals) are physically separate structures from the mobile devices 102, 302, 402 and the housings and/or cases of the mobile devices 102, 302, 402. In other words, the housings and/or cases of the mobile devices 102, 302, 402 and the components carried by the housings and/or cases of the mobile devices 102, 302, 402 are separate, different structures than the example cases 100, 300, 400 disclosed herein. For example, while the housings and/or cases of the mobile devices 102, 302, 402 house cellular communication modules, screens and/or keypads, the example cases 100, 300, 400 of FIGS. 1-4 do not house a cellular communication module, a screen, or a keypad. Rather, the example cases 100, 200, 400 of FIGS. 1-4 are meant to protect the components of the mobile devices (e.g., the housings and/or cases of the mobile devices) from damage (e.g., impact damage).

Figure 5:
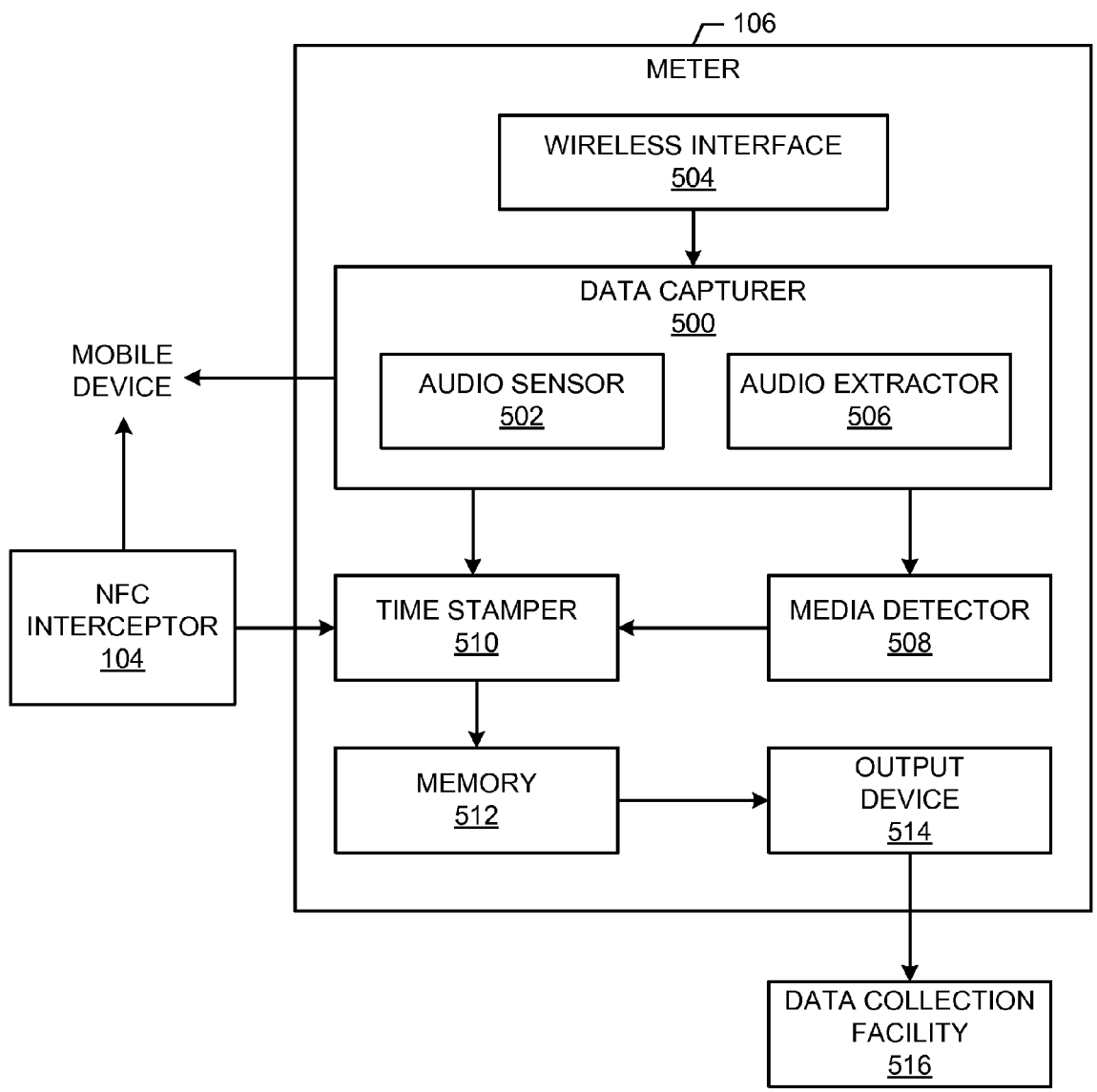
FIG. 5 is a block diagram of an example implementation of the example meter of FIGS. 1, 2, and/or 3.

FIG. 5 illustrates an example implementation of the example meter 106 of FIG. 1. While described below in connection with the example meter 106 of FIG. 1, the example meter 106 of FIG. 5 can additionally be used to implement the example meter 306 of FIG. 3 and/or the example meter 406 of FIG. 4. The example meter 106 of FIG. 5 includes a data capturer 500 to monitor the example smart phone 102 of FIG. 2 (and/or any other type of mobile media device, such as the example tablet 302 of FIG. 3 and/or the example media player 402 of FIG. 4) for media. In the illustrated example of FIG. 5, the data capturer 500 utilizes an audio sensor 502, such as a microphone, to collect an audio signal from an environment of the smart phone 102. For example, the audio sensor 502 detects an audio signal generated by the audio output device 112 of the smart phone 102. Additionally or alternatively, the example data capturer 500 of FIG. 5 utilizes a wireless interface 504 of the example smart phone case 100 of FIG. 1 to collect media data associated with the smart phone 102. In the illustrated example of FIG. 5, the wireless interface 504 is a Bluetooth® component capable of pairing with other Bluetooth® components, such as the wireless transceiver 114 of the smart phone 102. In such instances, the example data capturer 500 of FIG. 5 captures raw audio data (e.g., wireless data intended to be output as audio via an appropriate transducer (e.g., a speaker)) generated by the example smart phone 102 via the wireless interface 504. In some such instances, the smart phone 102 is instructed to maintain output of the audio via the audio output device 112 of the smart phone 102 while simultaneously transmitting the raw audio data to the example wireless interface 504 of the meter 106. Accordingly, the example data capturer 500 receives raw audio information, which does not include the noise typically captured by the example audio sensor 502, corresponding to the audio signal being generated by the audio output device 112 of the smart phone 102. Such a data capture technique is advantageous for the example smart phone case 100 of FIG. 1 and the example tablet case 300 of FIG. 3 which do not include peripheral audio systems. Alternatively, for the example media player case 400 of FIG. 4 which does include the peripheral audio system 418, the example wireless interface 504 of FIG. 5 communicates with the example wireless transceiver 416 of the media player case 400. In such instances, the corresponding mobile device (e.g., the media player 402 of FIG. 4) is instructed to route the audio data associated with currently playing media to the example wireless interface 416 of the media player 400 and not to the audio output device 412 of the media player 402. That is, the more powerful peripheral audio system 418 of the media player case 400 substitutes for the audio output device 412 of the media player 402. Accordingly, the example wireless interface 504 of FIG. 5 is additionally or alternatively configured to communicate with a wireless transceiver (e.g., the wireless transceiver 416 of FIG. 4) local to the corresponding peripheral (e.g., case).

The raw audio information collected by the example data capturer 500 of FIG. 5 via the wireless interface 504 is provided to an audio extractor 506. The example audio extractor 506 of FIG. 5 decodes, transcodes and/or otherwise processes the raw audio information provided by the wireless interface 504 such that the corresponding audio information can be identified. In some examples, the audio extractor 506 is bypassed and the raw audio information is conveyed to a different device and/or entity for further processing.

In some examples, the data capturer 500 of FIG. 5 simultaneously attempts to capture data via the wireless interface 504 and via the example audio sensor 502. Additionally or alternatively, the example data capturer 500 of FIG. 5 attempts to capture audio data via the wireless interface 504 when the wireless audio data is being received by the example smart phone case 102 (e.g., when the example wireless interface 504 is paired with and/or receiving audio information from the smart phone 102) and activates the audio sensor 502 when the wireless interface 504 is not providing data. In other words, the example audio sensor 502 may act as a backup collection mechanism to the collection of raw audio information via the wireless interface 504. Additional or alternative collection schemes are possible.

In the illustrated example of FIG. 5, the data capturer 500 provides collected audio information (e.g., an audio signal collected via the audio sensor 502 and/or raw audio data collected via the wireless interface 504 and/or the audio extractor 506) to a media detector 508 and/or a time stamper 510. An example implementation of the example media detector 508 is described in detail below. In some examples, the time stamper 510 also receives data from the NFC interceptor 104 of the smart phone case 100. The example time stamper 510 of the illustrated example includes a clock and a calendar. The example time stamper 510 associates a time period (e.g., 1:00 a.m. Central Standard Time (CST) to 1:01 a.m. CST) and date (e.g., Jan. 1, 2013) with each collected piece of audio information and/or NFC data by, for example, appending the period of time and date information to an end of the data. In some examples, the time stamper 510 applies a single time and date rather than a period of time. A data package (e.g., the audio information and/or NFC data, a corresponding time stamp, etc.) is stored in memory 512. The example memory 512 of FIG. 5 is implemented by any suitable type(s) of memory such as, for example, flash memory.

The example time stamper 510 of FIG. 5 also receives data from the example media detector 508. The example media detector 508 of FIG. 5 detects media identifying information in the audio data collected by the example data capturer 500. For example, the media detector 508 can identify a presentation time and/or a source of a media presentation. The presentation time and the source identification data may be utilized to identify the media by, for example, cross-referencing a look up table when the media corresponds to a scheduled event, such as webcast.

Additionally or alternatively, the example media detector 508 of FIG. 5 can identify the media by detecting codes and/or watermarks embedded with or otherwise conveyed with media being presented via the smart phone 102. As used herein, a code is an identifier that is transmitted with the media for the purpose of identifying (e.g., an audience measurement code) and/or for tuning to (e.g., a packet identifier (PID) header and/or other data used to tune or select packets in a multiplexed stream of packets) the corresponding media. Codes may be carried in the audio, in the video, in metadata, in a vertical blanking interval, in a program guide, in content data, or in any other portion of the media and/or the signal carrying the media. In the illustrated example, the media detector 508 extracts the code(s) from the media. In other examples, the media detector may collect samples of the media and export the samples to a remote site for detection of the code(s).

Additionally or alternatively, the example media detector 508 of FIG. 5 can collect a signature representative of a portion of the media. As used herein, a signature is a representation of a characteristic of the signal carrying or representing one or more aspects of the media (e.g., a frequency spectrum of an audio signal). Signatures may be thought of as fingerprints of the media. Collected signature(s) can be compared against a collection of reference signatures of known media (e.g., content and/or advertisements) to identify accessed media. In some examples, the signature(s) are generated by the media detector 508. Additionally or alternatively, the example media detector 508 collects samples of the media and exports the samples to a remote site for generation of the signature(s). In the example of FIG. 5, irrespective of the manner in which the media of the presentation is identified (e.g., based on tuning data, metadata, codes, watermarks, and/or signatures), the media identification information is time stamped by the time stamper 510 and stored in the memory 512.

In the illustrated example of FIG. 5, an output device 514 periodically and/or aperiodically exports the audience identification information and/or the media identification information from the memory 512 to a data collection facility 516 via a network (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.). In some examples, the example meter 106 utilizes the communication capabilities (e.g., network connections) of the smart phone 102 to convey information to, for example, the data collection facility 516. In some examples, the output device 514 utilizes the communication module 116 of the example smart phone case 100 to communicate to, for example, the data collection facility 516. In the illustrated example of FIG. 5, the data collection facility 516 is managed and/or owned by an audience measurement entity (e.g., The Nielsen Company (US), LLC). The audience measurement entity associated with the example data collection facility 516 of FIG. 5 utilizes the information generated by the meter 106 to generate, for example, exposure information. The information from many panelist locations may be collected and analyzed to generate ratings representative of media exposure by one or more populations of interest. Additionally or alternatively, the data can be analyzed to determine purchase trends and relationships between media exposure and purchase behavior.

In the illustrated example of FIG. 5, the time stamper 510 receives NFC data from the NFC interceptor 104. The example time stamper 510 of FIG. 5 time stamps the NFC data and provides the time stamped NFC data to the example memory 512 and/or the smart phone 100. The NFC data is conveyed to the example data collection facility 516 in a similar manner as the media detection information described above. The time stamps between the two data sources enable determination of trends between purchases and media exposures.

For clarity of illustration, internal connectors within some of the structure and/or circuitry of FIG. 5 are omitted. However, appropriate connectors, busses, and/or other means of communication are provided as needed in FIG. 5 to enable transfer of data and/or cooperation between components. In some examples, communication is achieved by writing data to a mutually accessible memory.

While the examples of FIGS. 1-4 illustrate cases for smart phones, tablets and media, examples disclosed herein may be implemented in connection with additional or alternative peripherals. For example, the example meter 106 of FIG. 5 may be implemented by (e.g., carried in) a key fob that is attachable to a key chain. In such instances, the example peripherals are in communication with the mobile devices such that detected information can be communicated (e.g., to the data collection facility).

While an example manner of implementing the meters 106, 306, 406 of FIGS. 1, 3, and/or 4 is illustrated in FIG. 5, one or more of the elements, processes and/or devices illustrated in FIG. 5 may be combined, divided, re-arranged, omitted, eliminated and/or implemented in any other way. Further, the example data capturer 500, the example wireless interface 504, the example audio extractor 506, the example media detector 508, the example time stamper 510 and/or, more generally, the example meter 106 of FIG. 5 may be implemented by hardware, software, firmware and/or any combination of hardware, software and/or firmware. Thus, for example, any of the example data capturer 500, the example wireless interface 504, the example audio extractor 506, the example media detector 508, the example time stamper 510 and/or, more generally, the example meter 106 of FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, data capturer 500, the example wireless interface 504, the example audio extractor 506, the example media detector 508, the example time stamper 510 and/or, more generally, the example meter 106 of FIG. 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example meters 106, 306, 406 of FIGS. 1, 3 and/or 4 may include one or more elements, processes and/or devices in addition to, or instead of, those illustrated in FIG. 5, and/or may include more than one of any or all of the illustrated elements, processes and devices.

Figure 6:
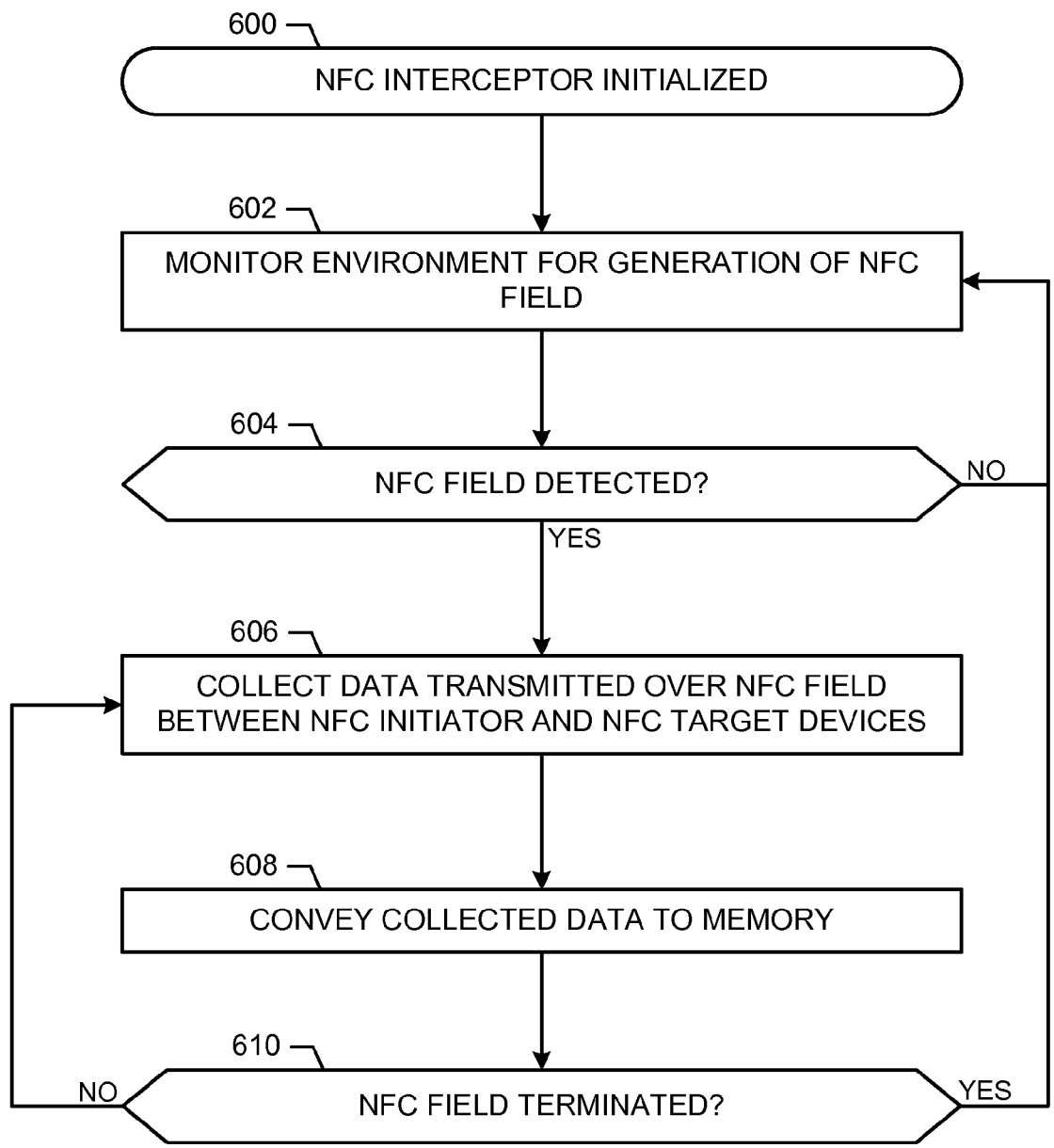
FIG. 6 is a flowchart representative of example machine readable instructions that may be executed to implement the example NFC interceptors of FIGS. 1, 2, 3, 4 and/or 5.
Figure 7:
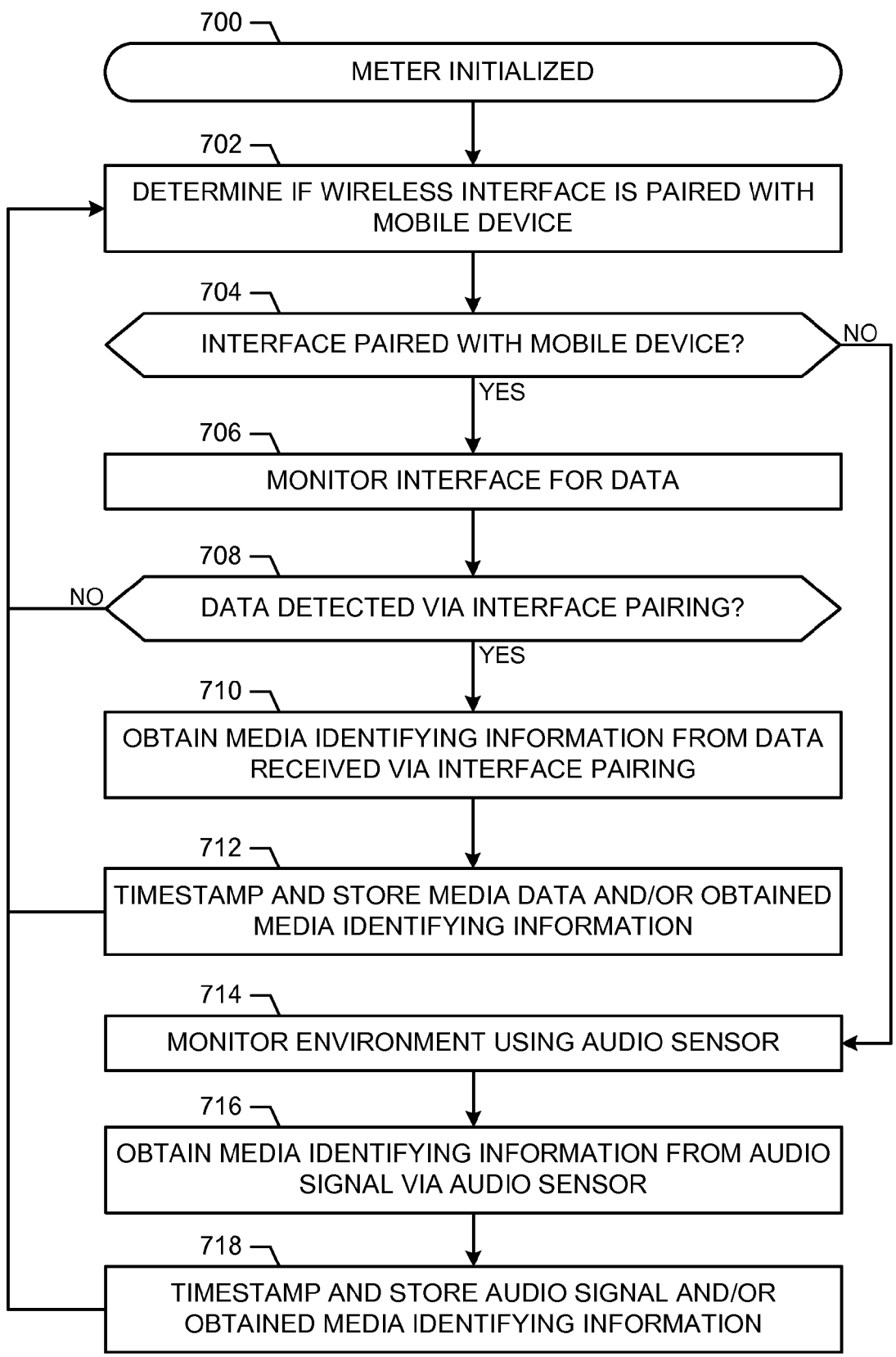
FIG. 7 is a flowchart representative of example machine readable instructions that may be executed to implement the example meters of FIGS. 1, 3, 4 and/or 5.
Figure 8:
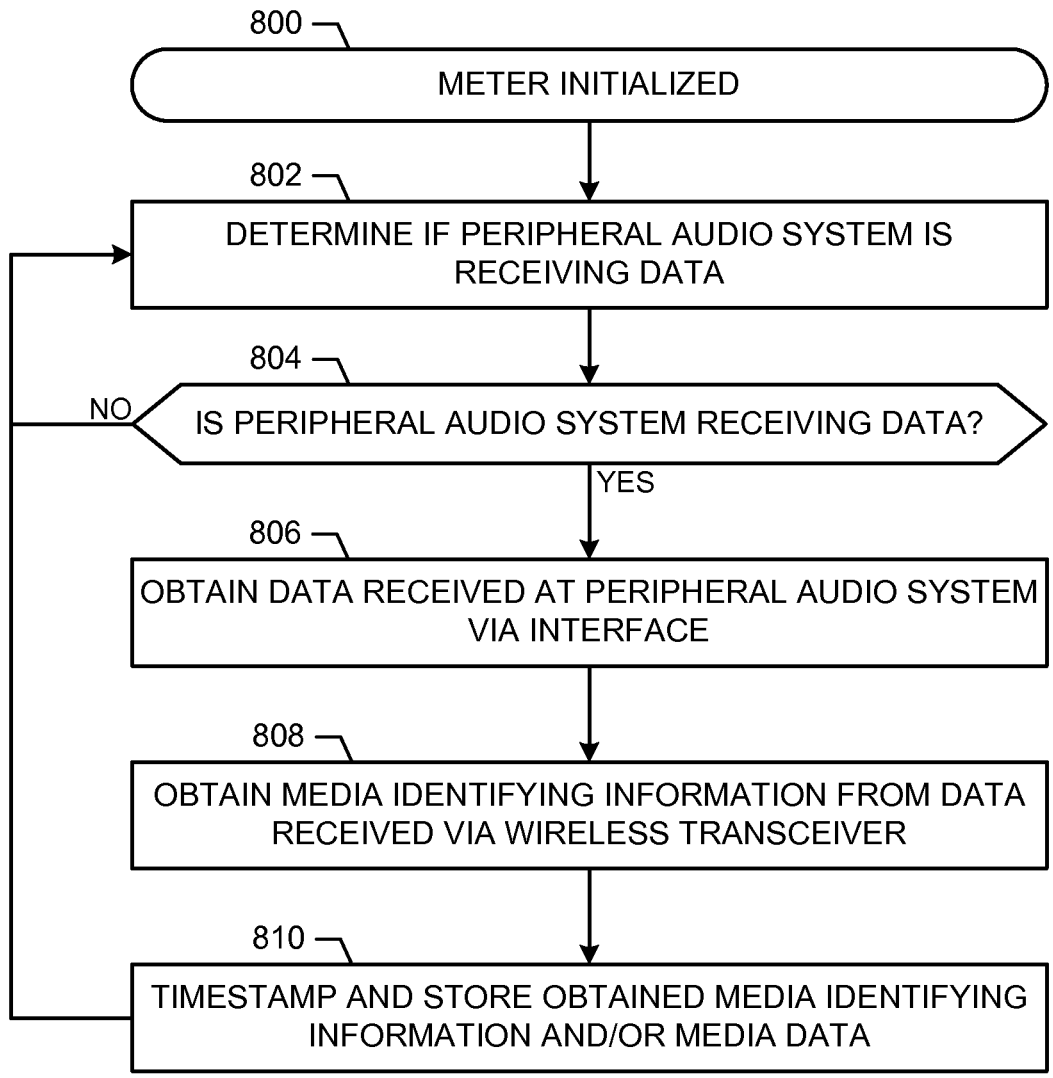
FIG. 8 is a flowchart representative of example machine readable instructions that may be executed to implement the example meters of FIGS. 4 and/or 5.

A flowchart representative of example machine readable instructions for implementing the example NFC interceptors 104, 304, 404 of FIGS. 1, 2, 3, 4 and/or 5 is shown in FIG. 6. A flowchart representative of example machine readable instructions for implementing the example meters 106, 306, 406 of FIGS. 1, 3, 4 and/or 5 is shown in FIG. 7. A flowchart representative of example machine readable instructions for implementing the example meter 406 of FIGS. 4 and/or 5 is shown in FIG. 8. In some examples, the machine readable instructions are implemented by a logic circuit such as an application specific integrated circuit (ASIC). In some examples, the instructions are stored in a tangible computer readable storage medium such as flash memory or Electronically Erasable Programmable Read-Only Memory (EEPROM). In some such examples, the machine readable instructions comprise a program for execution by a processor such as the processor 912 shown in the example processor platform 900 discussed below in connection with FIG. 9. The program may be embodied in software stored on a tangible computer readable storage medium such as a memory associated with the processor 912, but the entire program and/or parts thereof could alternatively be executed by a device other than the processor 912 and/or embodied in firmware or dedicated hardware. Further, although the example instructions are described with reference to the flowcharts illustrated in FIGS. 6-8, many other methods of implementing the example NFC interceptors 104, 304, 404 and/or the example meters 106, 306, 406 may alternatively be used. For example, the order of execution of the blocks may be changed, and/or some of the blocks described may be changed, eliminated, or combined.

As mentioned above, the example processes of FIGS. 6-8 may be implemented using coded instructions (e.g., computer and/or machine readable instructions) stored on a tangible computer readable storage medium such as a flash memory, a read-only memory (ROM), a cache, and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 6-8 may be implemented using coded instructions (e.g., computer and/or machine readable instructions) stored on a non-transitory computer and/or machine readable medium such as a flash memory, a read-only memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

The example of FIG. 6 is described below in connection with the example NFC interceptor 104 of FIG. 1. However, the example of FIG. 6 can be implemented by any of the example NFC interceptors 104, 304, 404 of FIGS. 1, 3 and/or 4. The example of FIG. 6 begins with an initialization of the NFC interceptor 104 (block 600). The NFC interceptor 600 determines whether an NFC field is present (block 602). For example, the NFC interceptor 600 detects an energy field generated by an NFC initiator (e.g., the smart phone 102 of FIG. 1). If an NFC field is detected (block 604), the example NFC interceptor 606 collects data transferred between the NFC initiator and one or more NFC target devices (e.g., the point-of-sale NFC device 200 of FIG. 2) (block 606). The NFC interceptor 104 conveys the collected data to a memory, such as the example memory 512 of FIG. 5 and/or memory of the smart phone 102 (block 608). If the detected NFC field is no longer detected (e.g., the field has been terminated) (block 610), control passes to block 602. If the detected NFC field persists (block 610), control passes to block 606.

The example of FIG. 7 is described below in connection with the example meter 106 of FIGS. 1 and/or 5. However, the example of FIG. 7 can be implemented by any of the example meters 106, 306, 406 of FIGS. 1, 3 and/or 4. The example of FIG. 7 begins with an initialization of the meter 106 (block 700). The meter 106 is initialized to, for example, monitor media accessed by the smart phone 102. As described above, the wireless interface 504 of the meter 106 can be paired with, for example, the wireless transceiver 114 of the smart phone 102. In the example of FIG. 7, the wireless interface 504 determines whether such a pairing is present (e.g., whether the smart phone case 100 is paired with the smart phone 102) (block 702). If the wireless interface 504 is paired with the smart phone 102 (block 704), the example data capturer 500 captures media data (e.g., wireless raw audio data) generated by the smart phone 102 via the wireless interface 504 (block 706). If data is not detected at the wireless interface 504 (block 708), control passes to block 702). If data is detected via the wireless pairing (block 708), the audio extractor 506 decodes, transcodes and/or otherwise processes the media data to obtain audio information from which media identifying information (e.g., signature(s), watermark(s), code(s), etc.) in the example of FIG. 7. The example audio extractor 506 provides the resulting data to the media detector 508. Additionally or alternatively, data can be provided directly to the media detector 508 (e.g., without processing of the audio extractor 506). In the illustrated example of FIG. 7, the media detector 508 analyzes the received data to obtain media identifying information (e.g., signature(s), watermark(s), code(s), etc.) indicative of the media being accessed by the smart phone 102 (block 710). The time stamper 510 assigns a time stamp to the media data and/or the obtained media identifying information (block 712). Further, the memory 512 stores the time stamped media data and/or the obtained media identifying information (block 712). Control then passes to block 702.

In the example of FIG. 7, if the wireless interface 504 of the meter 106 is not paired with the smart phone 102 (block 704), the audio sensor 512 collects an audio signal representative of the audio present in an environment of the smart phone case 100 (block 714). In some examples, the audio sensor 502 is previously inactive (e.g., while the example data capturer 500 is capturing data via a pairing of the wireless interface 504). In some examples, the audio sensor 502 is continuously collecting an audio signal. In the example of FIG. 7, the media detector 508 obtains media identifying information (e.g., signature(s), watermark(s), code(s), etc.) from the audio signal (block 716). The time stamper 510 assigns a time stamp to the audio signal and/or the obtained media identifying information (block 718). Further, the memory 512 stores the time stamped audio signal and/or the obtained media identifying information (block 718). Control then passes to block 702. Thus, the example of FIG. 7 includes the example meter 106 collecting and analyzing raw data obtained via a wireless pairing with the smart phone 102 when such a pairing and/or data is available. When the wireless pairing is not present, the example meter 106 monitors the environment of the smart phone 102 for an audio signal.

The example of FIG. 8 is described below in connection with the example meter 406 of FIG. 4, which is implemented in connection with the peripheral audio system 418 of the example media player case 400. As described above, the example media player case 400 includes the wireless transceiver 416 to pair with the wireless transceiver 414 of the media player 402 to facilitate transfer of audio data from the media player 402 to the peripheral audio system 418. In the example of FIG. 8, the meter 406 is initialized (block 800) and the wireless interface 504 of the meter 406 determines whether the peripheral audio system 418 is received data from the media player 402 (block 802). In particular, the example wireless interface 504 determines whether the wireless transceiver 416 of the media player case 400 is paired with the wireless transceiver 414 of the media player 402. If the peripheral audio system 418 is receiving data (block 804), the example data capturer 500 captures the media data via the wireless interface 504 (block 806). In the example of FIG. 8, the audio extractor 506 decodes, transcodes and/or otherwise processes the media data to obtain audio information from which media identifying information (e.g., signature(s), watermark(s), code(s), etc.). The example audio extractor 506 provides the resulting data to the media detector 508. Additionally or alternatively, data can be provided directly to the media detector 508 (e.g., without processing of the audio extractor 506). In the illustrated example of FIG. 8, the media detector 508 analyzes the received data to obtain media identifying information (e.g., signature(s), watermark(s), code(s), etc.) indicative of the media being accessed by the media player 402 (block 808). The time stamper 510 assigns a time stamp to the media data and/or the obtained media identifying information (block 810). Further, the memory 512 stores the time stamped media data and/or the obtained media identifying information (block 810). Control then passes to block 802.

Figure 9:
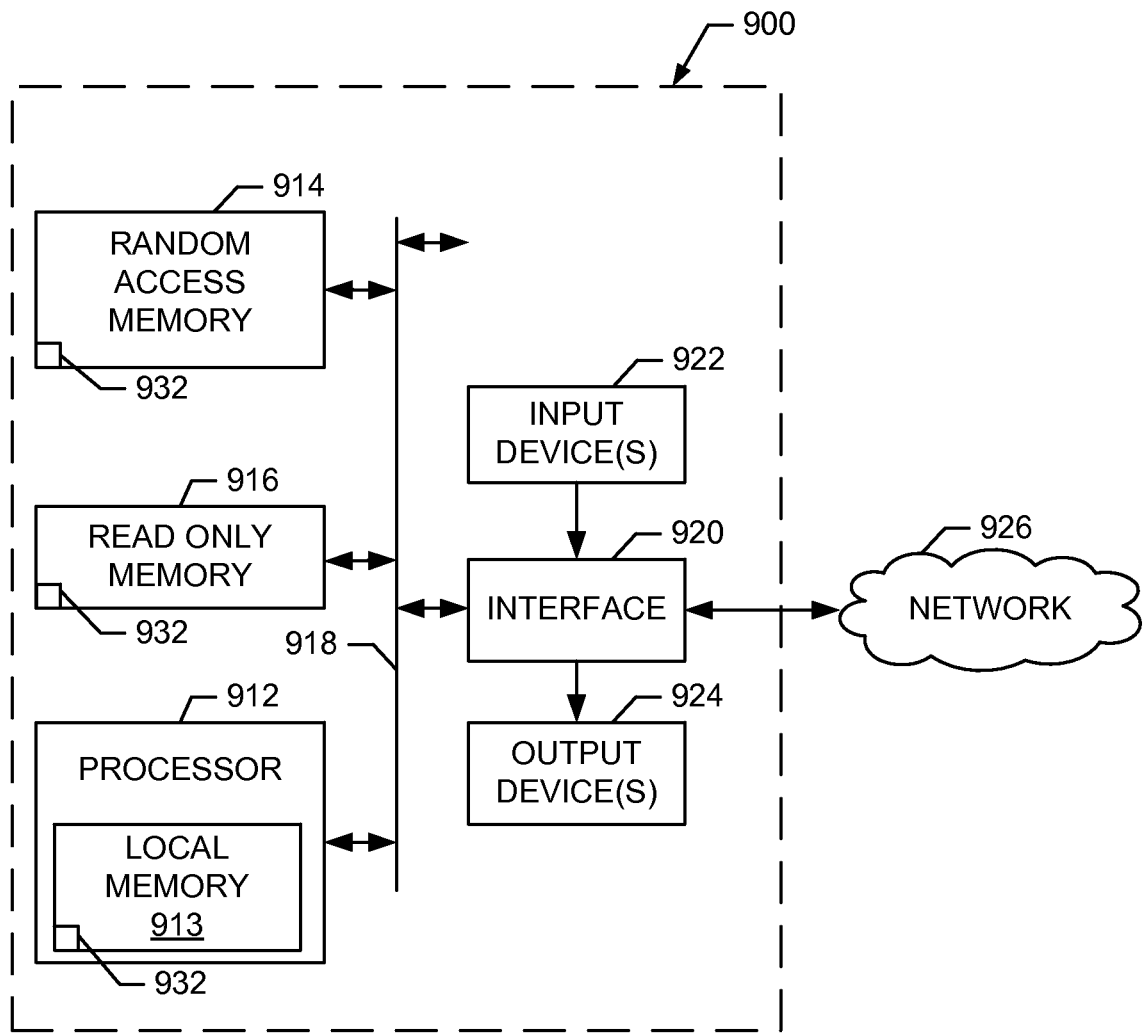
FIG. 9 is a block diagram of an example processing system capable of executing the example machine readable instructions of FIG. 6 to implement the NFC interceptors of FIGS. 1, 2, 3, and/or 4, the instructions of FIG. 7 to implement the meters of FIGS. 1, 3, 4 and/or 5, and/or the instructions of FIG. 8 to implement the meters of FIGS. 4 and/or 5.

FIG. 9 is a block diagram of an example processor platform 900 capable of executing the instructions of FIG. 6 to implement the NFC interceptors 104, 304, 404 of FIGS. 1, 2, 3, and/or 4, the instructions of FIG. 7 to implement the meters 106, 306, 406 of FIGS. 1, 3, 4 and/or 5, and/or the instructions of FIG. 8 to implement the meters 406 of FIGS. 4 and/or 5. The processor platform 900 can be any suitable computing device such as, for example, a system on chip (SoC) and/or ASIC.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, and/or a button.

One or more output devices 924 are also connected to the interface circuit 920 of the illustrated example. The output devices 924 can be implemented, for example, a light emitting diode (LED).

The interface circuit 920 of the illustrated example also includes a communication device such as a transmitter, a receiver, a transceiver, and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The coded instructions 932 of FIGS. 6-8 may be stored in the volatile memory 914 and/or in the non-volatile memory 916.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A mobile device case, comprising:
   a shell having a form factor dimensioned to receive a mobile device; and
   a near-field interceptor coupled to the shell, the near-field interceptor to capture data communicated via a near-field energy field between a first near-field communication device of the mobile device and a second near-field communication device external to the mobile device, the near-field interceptor to capture the data when the mobile device is in direct communication with the second near-field communication device using the near-field energy field.

2. The mobile device case as defined in claim 1, wherein the near-field interceptor is coupled to the shell in a position proximate the first near-field communication device of the mobile device when the mobile device is carried by the shell.

3. The mobile device case as defined in claim 2, wherein the position is aligned with a battery cover of the mobile device when the mobile device is carried by the shell.

4. The mobile device case as defined in claim 1, wherein the shell includes a hinged cover portion, and the near-field interceptor is carried by the hinged cover portion.

5. The mobile device case as defined in claim 1, wherein the shell includes interlocking portions, and the near-field interceptor is coupled to one of the interlocking portions that aligns with the first near-field communication device of the mobile device when the mobile device is carried by the shell.

6. The mobile device case as defined in claim 1, further including memory to store data collected by the near-field interceptor.

7. The mobile device case as defined in claim 6, wherein the memory is located in the mobile device case.

8. The mobile device case as defined in claim 6, wherein the memory is resident in the mobile device.

9. The mobile device case as defined in claim 6, wherein the data is to be conveyed to a central facility via a communication device of the mobile device.

10. The mobile device case as defined in claim 1, wherein the mobile device case does not include a screen or keypad.

11. The mobile device case as defined in claim 1, wherein the mobile device case is to protect the mobile device.

12. An apparatus, comprising:
    a housing to carry a first Near Field Communication (NFC) enabled device having a first NFC communicator that communicates data via an NFC field; and
    an interceptor physically located in the housing and separate from the first NFC-enabled device such that the interceptor is positioned in the NFC field when the first NFC communicator is active, the interceptor to collect the data communicated via the NFC field between the first NFC communicator of the first NFC-enabled device and a second NFC communicator of a second NFC-enabled device different than the first NFC-enabled device, the interceptor to collect the data when the first NFC-enabled device is in direct communication with the second NFC-enabled device using the NFC field.

13. The apparatus as defined in claim 12, wherein the first NFC-enabled device includes a mobile device having a form factor dimensioned to securely fit within the housing.

14. The apparatus, as defined in claim 12, wherein the interceptor includes an NFC antenna carried by the housing.

15. The apparatus as defined in claim 12, further including memory to store the data collected by the interceptor.

16. The apparatus as defined in claim 15, wherein the memory is located in the housing.

17. The apparatus as defined in claim 15, wherein the memory is resident in the first NFC-enabled device.

18. The apparatus as defined in claim 15, wherein the data is to be conveyed to a central facility via a communication device of the first NFC-enabled device.

19. The apparatus as defined in claim 12, further including a meter located in the housing to collect media identifying information corresponding to media presented by the first NFC-enabled device.

20. The apparatus as defined in claim 12, wherein the interceptor is a passive device.

21. The apparatus as defined in claim 12, wherein the interceptor is an active device.

22. A method, comprising:
   determining, via a first near-field device integrated in a mobile device case, that a near-field energy field is present between a near-field initiator device and a near-field target device, wherein one of the near-field initiator device and the near-field target device is a component of a mobile device carried by the mobile device case, and the first near-field device is neither the near-field initiator device nor the near-field target device;
   collecting, via the first near-field device, data transmitted between the near-field initiator device and the near-field target device via the NFC field, the first near-field device to collect the data when the near-field initiator device is in direct communication with the near-field target device using the NFC field; and
   conveying the collected data from the first near-field device to a memory.

23. The method as defined in claim 22, wherein the conveying of the collected data to the memory includes transmitting the collected data to the mobile device.

24. The method as defined in claim 22, wherein the memory is located in the mobile device case.

25. The method as defined in claim 22, wherein the mobile device case is a shell having a form factor dimensioned to snugly receive the mobile device.

* * * * *